(12) United States Patent
Baier et al.

(10) Patent No.: US 8,519,996 B2
(45) Date of Patent: Aug. 27, 2013

(54) METHOD AND SYSTEM FOR CONVERSION OF GRAPHICAL REPRESENTATIONS OF AUTOMATION ENVIRONMENTS

(75) Inventors: John Joseph Baier, Mentor, OH (US); Kevin George Gordon, Vancouver (CA); Mark David Hobbs, Hartford, WI (US); Monte Leroy Fevang, Surrey (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 859 days.

(21) Appl. No.: 12/242,701

(22) Filed: Sep. 30, 2008

(65) Prior Publication Data

US 2010/0079486 A1   Apr. 1, 2010

(51) Int. Cl.
*G06T 15/00* (2011.01)

(52) U.S. Cl.
USPC ........... 345/418; 345/419; 345/629; 715/229; 715/247; 715/255

(58) Field of Classification Search
USPC ................ 345/418, 619, 629, 419; 715/229, 715/247, 255
See application file for complete search history.

(56) References Cited

U.S. PATENT DOCUMENTS

| | | | | |
|---|---|---|---|---|
| 7,535,477 B2* | 5/2009 | Zaima et al. | ................. | 345/619 |
| 7,636,097 B1* | 12/2009 | Holloway | ................. | 345/619 |
| 7,810,025 B2* | 10/2010 | Blair et al. | ................. | 715/239 |
| 7,982,749 B2* | 7/2011 | Mathew et al. | ................. | 345/619 |

* cited by examiner

*Primary Examiner* — Phu K Nguyen

(57) ABSTRACT

A method for the conversion of graphical representations of automation environments is provided. The method includes receiving first graphics data in a first format comprising a first graphical representation of a first portion of an automation environment, processing the first graphics data to convert the first graphics data to second graphics data in a second format, where the second graphics data comprises a second graphical representation of the first portion of the automation environment, and transferring the second graphics data for delivery to and display on a client device.

16 Claims, 4 Drawing Sheets

METHOD AND SYSTEM FOR CONVERSION OF GRAPHICAL REPRESENTATIONS OF AUTOMATION ENVIRONMENTS

TECHNICAL BACKGROUND

Automation environments typically include a quantity of machines controlled and monitored by human-machine interfaces. These human-machine interfaces may be configured to control the machines while displaying automation data related to the present or past states of the machines. The interfaces may vary widely in complexity as required by particular machines and automation environments.

Often human-machine interfaces are located within an industrial enterprise where they are used by operators to control the machines. One or more human-machine interfaces may be monitored by a supervisor or engineer via an aggregation server, allowing the supervisor or engineer to monitor the operation of the machines from a central location. This location may be a particular location within the industrial enterprise either local or remote to the actual machines under inspection.

Further, large companies may have multiple automation environments distributed throughout multiple locations. When supervisors, engineers or managers are at locations remote from an industrial enterprise that they need to monitor, they may require access to the information contained within the human-machine interface or the aggregation server from the remote location. However, the remote location may not have devices configured the same as those within the industrial enterprise. These remote client devices may have differing display capabilities.

For example, an engineer at a remote location may attempt to access data from a human-machine interface or aggregation server using a client device including a display that has much poorer resolution than the displays in the industrial enterprise. When graphical representations of the machines are transmitted to the client device for display their normal size and complexity may prevent the graphical representations from displaying in a usable manner on the client device.

OVERVIEW

A method for the conversion of graphical representations of automation environments is provided. The method includes receiving first graphics data in a first format comprising a first graphical representation of a first portion of an automation environment, processing the first graphics data to convert the first graphics data to second graphics data in a second format, where the second graphics data comprises a second graphical representation of the first portion of the automation environment, and transferring the second graphics data for delivery to and display on a client device.

An industrial automation system including a human machine interface and an aggregation server is provided. The human-machine interface is configured to create first graphics data in a first format comprising a first graphical representation of a first portion of an automation environment. The aggregation server is configured to receive the first graphics data in the first format comprising the first graphical representation of the first portion of the automation environment, process the first graphics data to convert the first graphics data to second graphics data in a second format, where the second graphics data comprises a second graphical representation of the first portion of the automation environment, and to transfer the second graphics data for delivery to and display on a client device.

A computer-readable medium having instructions stored thereon for operating a computer system is provided. The instructions, when executed by the computer system, direct the computer system to receive first graphics data in a first format comprising a first graphical representation of a first portion of an automation environment from a human-machine interface, process the first graphics data to convert the first graphics data to second graphics data in a second format, where the second graphics data comprises a second graphical representation of the first portion of the automation environment, and to transfer the second graphics data for delivery to and display on a client device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
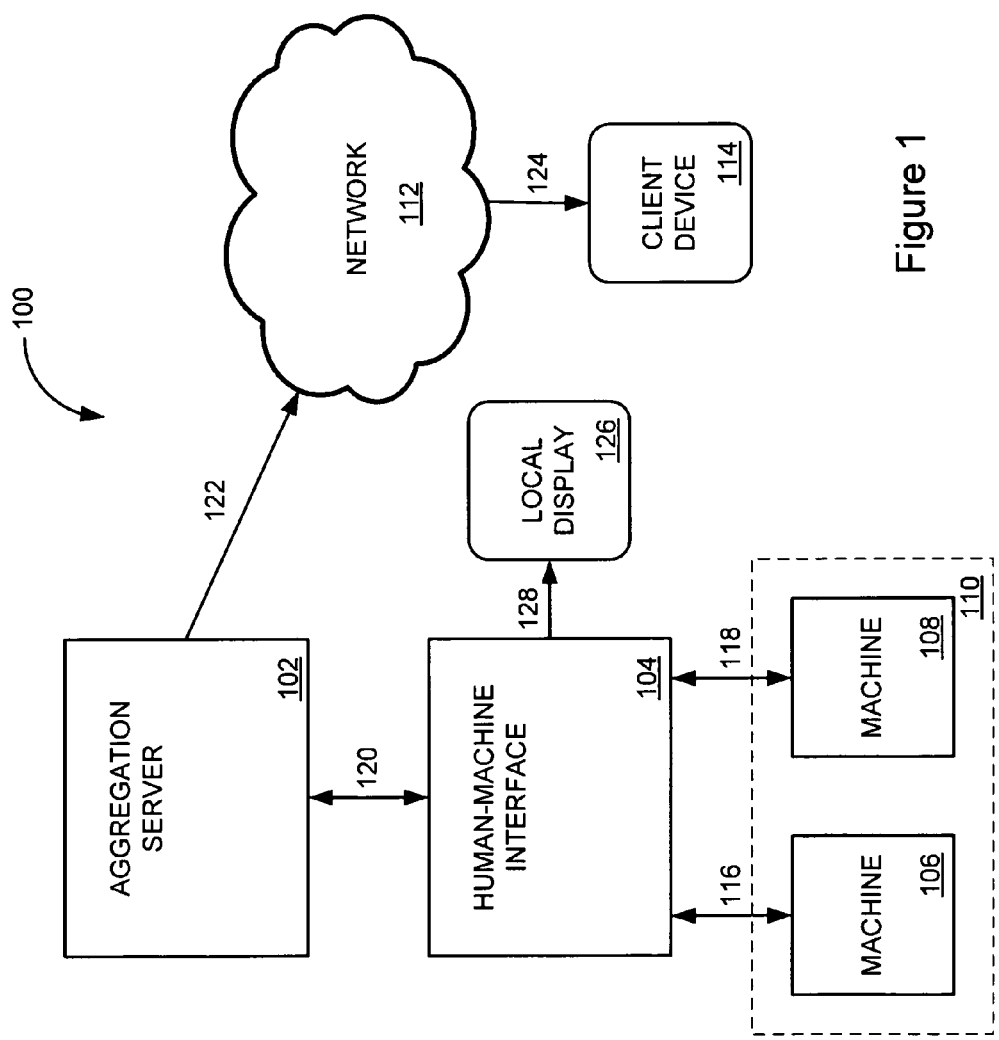
FIG. 1 is a block diagram illustrating an industrial automation system configured for conversion of graphical representations of automation environments.

FIG. 1 is a block diagram illustrating an industrial automation system 100 configured for conversion of graphical representations of automation environments. In this example, industrial automation system 100 includes automation environment 110, human-machine interface 104, and aggregation server 102. Automation environment 110 includes machine 106 and machine 108. Client device 114 is being used to remotely view automation data from human-machine interface 104 through aggregation server 102.

Human-machine interface 104 is coupled to machine 106 through link 116, and to machine 108 through link 116. Aggregation server 102 is coupled to human-machine interface 104 through link 120. Local display 126 is coupled to human-machine interface through link 128. Client device 114 is coupled to aggregation server 102 through network 112 and links 122 and 124.

These links may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, code division multiple access, worldwide interoperability for microwave access, or any other communication protocols and formats, including combinations thereof. Further, the links could be direct links or they might include various intermediate components, systems, and networks.

Machines 106 and 108 represent a first portion of automation environment 110. Other machines (not shown) may be present in other portions of automation environment 110. These machines are monitored and controlled by human-machine interface 104. In this example, human-machine interface 104 is configured to graphically display the configuration and status of machines 106 and 108 on local display 126. Human-machine interface 104 is also configured to send graphics data representing the first portion of automation environment 110 to aggregation server 102. This graphics data may include a graphical representation of machines 106 and 108. When performance data is received from machines 106 and 108 it is incorporated with the graphical representation of machines 106 and 108 and sent to local display 126 as a graphical representation of the configuration and status of machines 106 and 108.

When a remote user desires to access this graphical representation through client device 114, network 112, and aggregation server 102, the graphical representation may require format conversion before it may be displayed on client device 114. For example, if local display 126 has a resolution much greater than the resolution of the display of client device 114, only a portion of the graphical representation may be displayed at one time on the display of client device 114.

When aggregation server 102 receives a graphical representation of the first portion of automation environment 110 from human-machine interface 104 in a first format, it converts the graphical representation to a second format capable of display on a wide variety of client devices. In this example, the first format is a raster format of graphical data, while the second format is a vector format of graphical data. Vector formats allow the graphical data to be displayed on a wide variety of client devices having a wide variety of resolutions without a loss of data due to improper display of the graphical representation.

Figure 2:
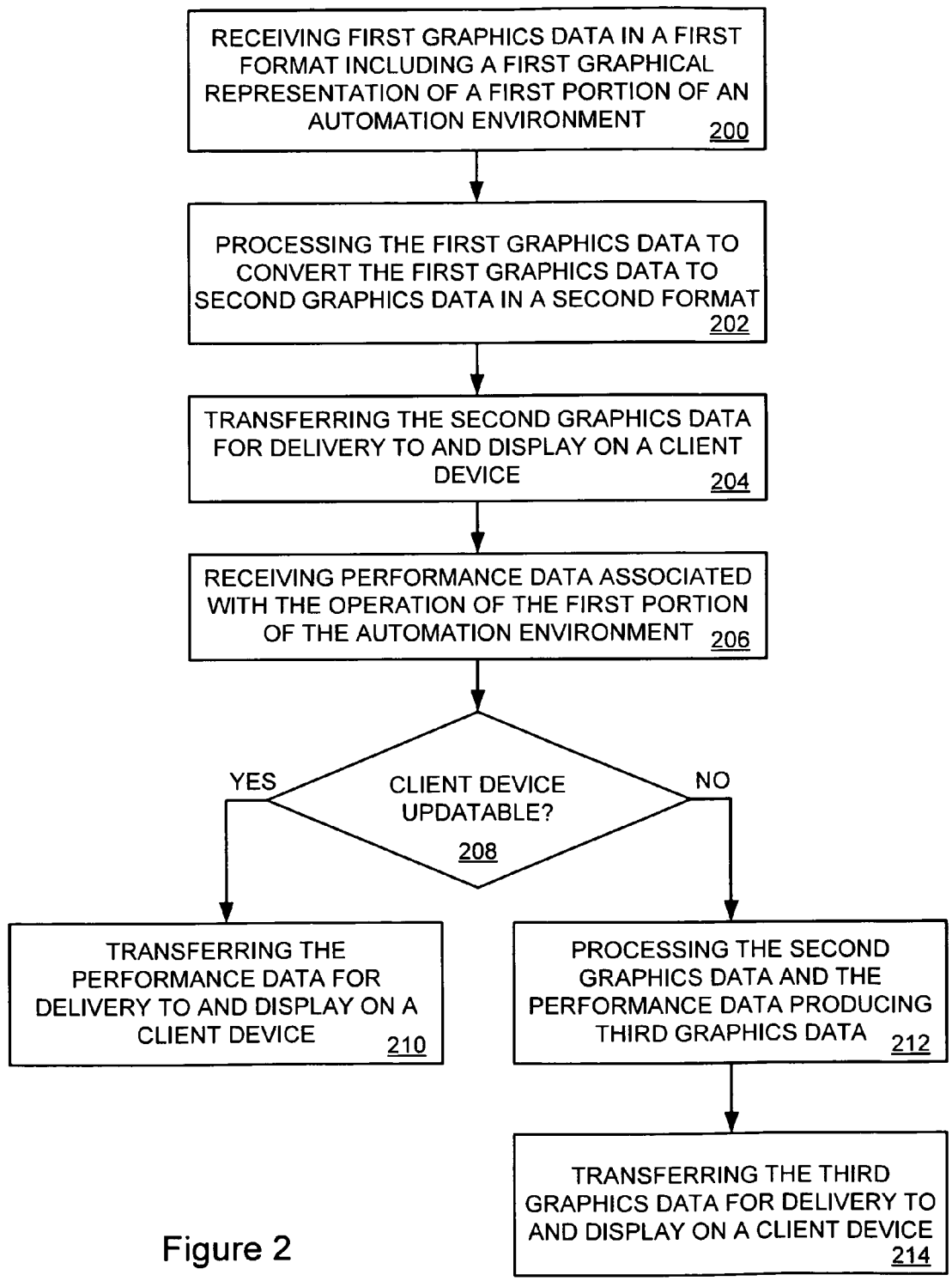
FIG. 2 is a flow chart illustrating a method for the conversion of graphical representations of automation environments.

FIG. 2 is a flow chart illustrating a method for the conversion of graphical representations of automation environments. Aggregation server 102 receives first graphics data in a first format including a first graphical representation of a first portion of an automation environment from human-machine interface 104 (operation 200).

Aggregation server 102 processes the first graphics data to convert the first graphics data to second graphics data in a second format (operation 202). Aggregation server 102 transfers the second graphics data for delivery and display on client device 114 (operation 204). Aggregation server 102 may also receive performance data associated with the operation of the first portion of the automation environment from human-machine interface 104 (operation 206).

At this point, it is determined whether or not client device 114 is capable of incorporating the performance data into the second graphics data, or if aggregation server 102 must incorporate the performance data into a further set of graphics data (operation 208). If client device 114 is capable of incorporating the performance data into the second graphics data, aggregation server 102 transfers the performance data for delivery and display on client device 114 (operation 210). Otherwise, aggregation server 102 processes the second graphics data and the performance data producing third graphics data (operation 212). Aggregation server 102 then transfers the third graphics data for delivery and display on client device 114 (operation 214).

Figure 3:
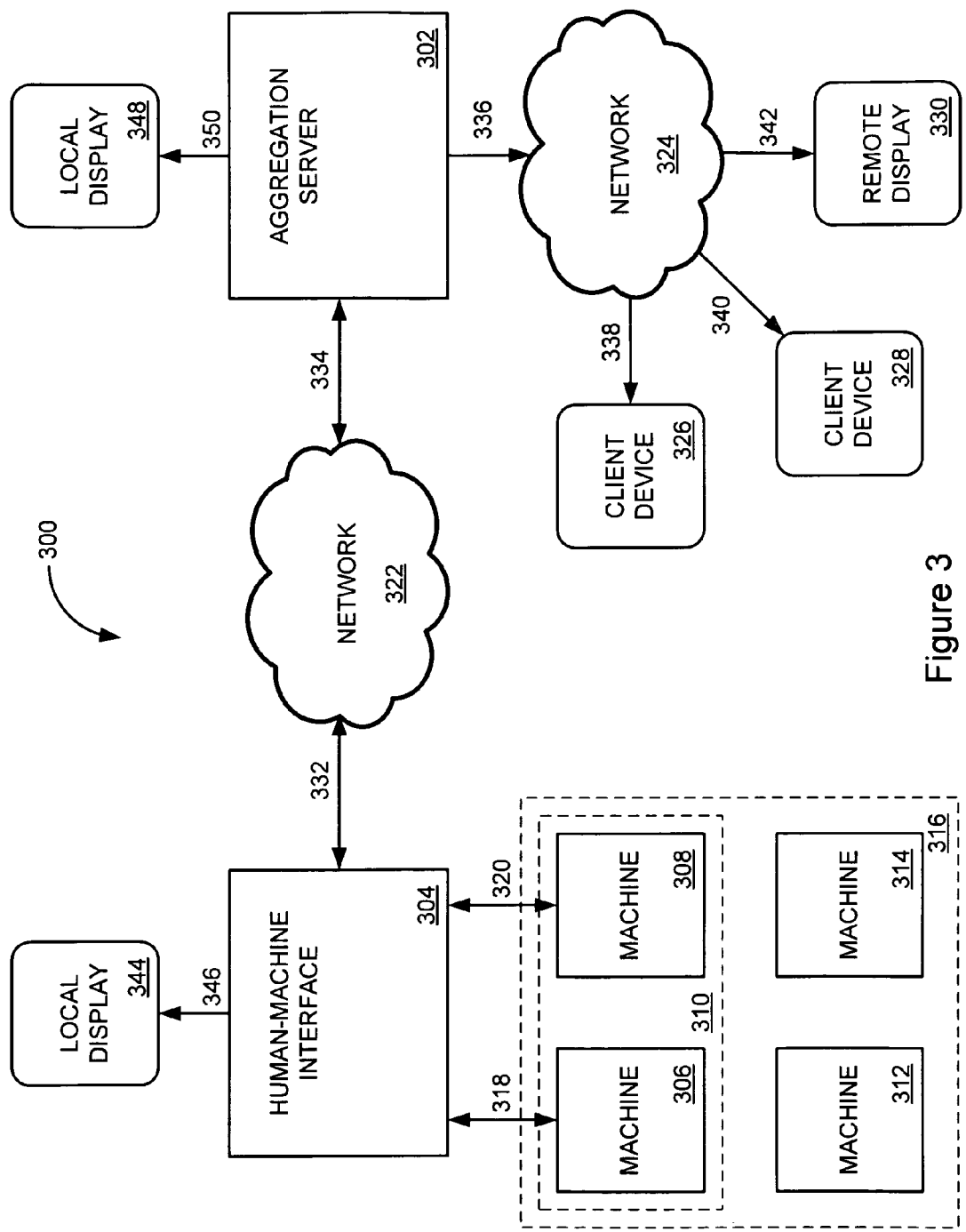
FIG. 3 is a block diagram illustrating an industrial automation system configured for conversion of graphical representations of automation environments.

FIG. 3 is a block diagram illustrating an industrial automation system 300 configured for conversion of graphical representations of automation environments. The example industrial automation system 300 illustrated by FIG. 3, is similar to, but more complex than, the example industrial automation system 100 illustrated by FIG. 1.

In this example, industrial automation system 300 includes aggregation server 302, human-machine interface 304, and automation environment 316. Automation environment 316 includes machine 306, machine 308, machine 312, and machine 314. A first portion 310 of automation environment 316 includes machines 306 and 308.

Human-machine interface 304 is coupled to machine 306 through link 318, and to machine 308 through link 320. Local display 344 is coupled to human-machine interface 304 through link 346. Aggregation server 302 is coupled to human-machine interface 304 through network 322 and links 332 and 334. Local display 348 is coupled to aggregation server 302 through link 350. Client device 326 is coupled to aggregation server 302 through network 324 and links 338 and 336. Client device 328 is coupled to aggregation server 302 through network 324 and links 340 and 336. Remote display 330 is coupled to aggregation server 302 through network 324 and links 342 and 336.

These links may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, code division multiple access, worldwide interoperability for microwave access, or any other communication protocols and formats, including combinations thereof. Further, the links could be direct links or they might include various intermediate components, systems, and networks.

Machines 306 and 308 represent a first portion 310 of automation environment 316. Machines 312 and 314 represent other portions of automation environment 316. These machines are monitored and controlled by human-machine interface 304. In this example, human-machine interface 304 is configured to graphically display the configuration and status of machines 306 and 308 on local display 344. Human-machine interface 304 is also configured to send graphics data representing the first portion 310 of automation environment 316 to aggregation server 302. This graphics data may include a graphical representation of machines 306 and 308. When performance data is received from machines 306 and 308 it is incorporated with the graphical representation of machines 306 and 308 and sent to local display 344 as a graphical representation of the configuration and status of machines 306 and 308.

When a remote user desires to access this graphical representation from client devices 326 or 328, or remote display 330, through network 324, and aggregation server 302, the graphical representation may require format conversion before it may be displayed on client devices 326 or 328, or remote display 330. For example, if local display 344 has a resolution much greater than the resolution of the display of client device 326, only a portion of the graphical representation may be displayed at one time on the display of client device 326. Further, client device 328 may have a resolution different from both local display 344 and client device 326.

When aggregation server 302 receives first graphics data including a graphical representation of the first portion 310 of automation environment 316 from human-machine interface 304 in a first format, it converts the graphical representation to second graphics data having a second format capable of display on a wide variety of client devices. In this example, the first format is a raster format of graphical data, while the second format is a vector format of graphical data. Vector formats allow the graphical data to be displayed on a wide variety of client devices having a wide variety of resolutions without a loss of data due to improper display of the graphical representation.

In some examples, aggregation server 302 monitors human-machine interface 304 for any changes to the first portion 310 of automation environment 316. When changes to the first portion 310 of automation environment 316 are detected, aggregation server 302 receives fourth graphics data in the first format from human-machine interface 304. This fourth graphics data includes the changes to the first portion 310 of automation environment 316. These changes may occur due to changes in the configuration of machines 306 and 308, or perhaps the addition of another machine to the first portion 310 of automation environment 316.

When aggregation server 302 receives the fourth graphics data in the first format, it converts it to fifth graphics data in the second format so that it may be transmitted to client devices 326 and 328 and remote display 330. In some examples, aggregation server 302 converts the fourth graphics data from a raster graphics format to fifth graphics data in a vector graphics format. Further changes in the first portion 310 of automation environment 316 will likewise result in aggregation server 302 receiving updated graphics data from human-machine interface 304 in a first format and converting it to a second format for transmission to client devices 326 and 328, and remote display 330.

The methods, systems, devices, processors, equipment, and servers described above may be implemented with, contain, or be executed by one or more computer systems. The methods described above may also be stored on a computer readable medium for execution by a computer system. Many of the elements of industrial automation systems 100 and 300 may be, comprise, or include computer systems. This includes, but is not limited to aggregation server 102, human-machine interface 104, client device 114, aggregation server 302, human-machine interface 304, client device 326, and client device 328. These computer systems are illustrated, by way of example, in FIG. 4.

Figure 4:
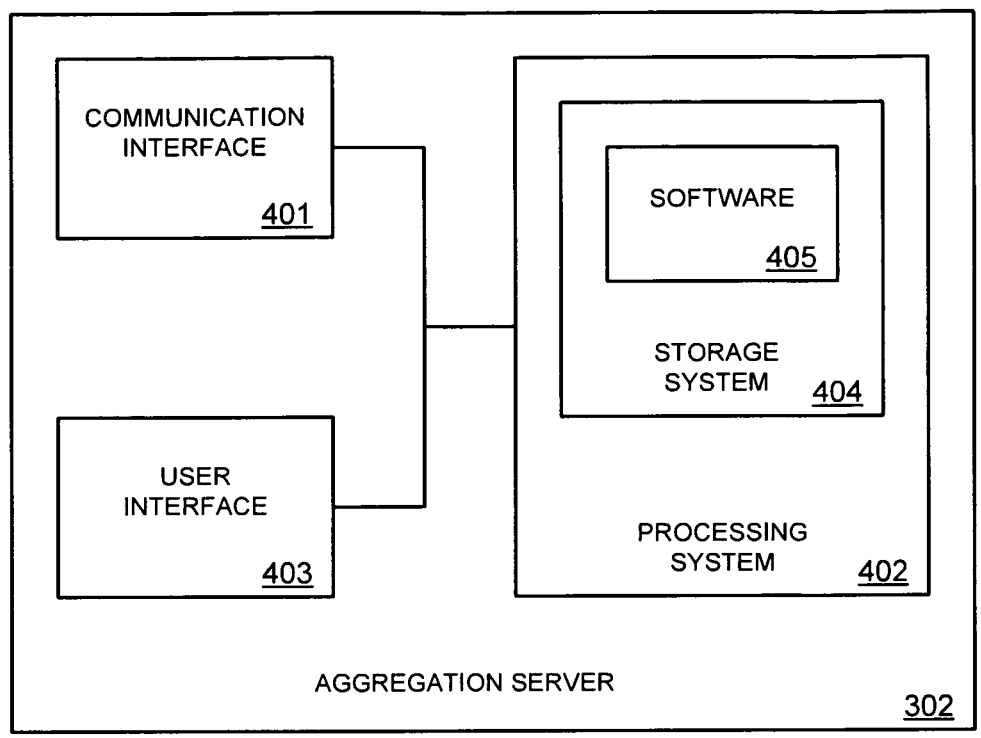
FIG. 4 is a block diagram illustrating an aggregation server configured for conversion of graphical representations of automation environments.

FIG. 4 is a block diagram illustrating an aggregation server 302 configured for conversion of graphical representations of automation environments. Aggregation server 302 includes communication interface 401, processing system 402, and user interface 403. Processing system 402 includes storage system 404. Storage system 404 stores software 405. Processing system 402 is linked to communication interface 401 and user interface 403. Aggregation server 302 could be comprised of a programmed general-purpose computer, although those skilled in the art will appreciate that programmable or special purpose circuitry and equipment may be used. Aggregation server 302 may be distributed among multiple devices that together comprise elements 401-405.

Communication interface 401 could comprise a network interface, modem, port, transceiver, or some other communication device. Communication interface 401 may be distributed among multiple communication devices. Processing system 402 could comprise a computer microprocessor, logic circuit, or some other processing device. Processing system 402 may be distributed among multiple processing devices. User interface 403 could comprise a keyboard, mouse, voice recognition interface, microphone and speakers, graphical display, touch screen, or some other type of user device. User interface 403 may be distributed among multiple user devices. Storage system 404 could comprise a disk, tape, integrated circuit, server, or some other memory device. Storage system 404 may be distributed among multiple memory devices.

Processing system 402 retrieves and executes software 405 from storage system 404. Software 405 may comprise an operating system, utilities, drivers, networking software, and other software typically loaded onto a computer system. Software 405 could comprise an application program, firmware, or some other form of machine-readable processing instructions. When executed by processing system 402, software 405 directs processing system 402 to operate as described herein.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for the conversion of graphical representations of automation environments comprising:
   receiving first graphics data in a first format comprising a first graphical representation of a first portion of an automation environment;
   processing the first graphics data to convert the first graphics data to second graphics data in a second format;
   receiving performance data associated with the operation of the first portion of the automation environment;
   determining whether a client device is capable of incorporating the performance data into the second graphics data; and
   transferring the performance data and the second graphics data to the client device, for incorporation of the performance data into the second graphics data by the client device only if the client device is determined to be capable of incorporating the performance data into the second graphics data.

2. The method of claim 1,
   wherein the first format is a raster graphics format, and the second format is a vector graphics format.

3. The method of claim 1, further comprising:
   incorporating the performance data into the second graphics data and transferring the incorporated performance data and the second graphics data to the client device only if the client device is determined not to be capable of incorporating the performance data into the second graphics data.

4. The method of claim 1, further comprising:
   detecting a change in the first portion of the automation environment;
   receiving third graphics data in the first format comprising a third graphical representation of the first portion of the automation environment;
   processing the third graphics data to convert the third graphics data to fourth graphics data in the second format; and transferring the fourth graphics data for delivery to and display on the client device.

5. The method of claim 4, further comprising:
monitoring the automation environment to detect a change in the first portion of the automation environment.

6. An industrial automation system comprising:
a human-machine interface configured to create first graphics data in a first format comprising a first graphical representation of a first portion of an automation environment;
a server configured to:
  receive the first graphics;
  process the first graphics data to convert the first graphics data to second graphics data in a second format,
  receive performance data associated with the operation of the first portion of the automation environment;
  determine whether a client device is capable of incorporating the performance data into the second graphics data; and
  transfer the performance data and the second graphics data to the client device, for incorporation of the performance data into the second graphics data by the client device only if the client device is determined to be capable of incorporating the performance data into the second graphics data.

7. The industrial automation system of claim 6,
wherein the first format is a raster graphics format, and the second format is a vector graphics format.

8. The industrial automation system of claim 6,
wherein the human-machine interface is also configured to:
  receive performance data associated with the operation of the first portion of the automation environment; and
  transfer the performance data to the server.

9. The industrial automation system of claim 6,
wherein the server is also configured to:
  incorporate the performance data into the second graphics data and transfer the incorporated performance data and the second graphics data to the client device only if the client device is determined not to be capable of incorporating the performance data into the second graphics data.

10. The industrial automation system of claim 6,
wherein the human-machine interface is also configured to:
  detect a change in the first portion of the automation environment; and wherein the server is also configured to:
  receive third graphics data in the first format comprising a third graphical representation of the first portion of the automation environment;
  process the third graphics data to convert the third graphics data to fourth graphics data in the second format; and
  transfer the fourth graphics data for delivery to and display on the client device.

11. The industrial automation system of claim 10,
wherein the human-machine interface is also configured to:
  monitor the automation environment to detect a change in the first portion of the automation environment.

12. A computer-readable medium having instructions stored thereon for operating a computer system, wherein the instructions, when executed by the computer system, direct the computer system to:
  receive first graphics data in a first format comprising a first graphical representation of a first portion of an automation environment from a human-machine interface;
  process the first graphics data to convert the first graphics data to second graphics data in a second format;
  receive performance data associated with the operation of the first portion of the automation environment;
  determine whether a client device is capable of incorporating the performance data into the second graphics data; and
  transfer the performance data and the second graphics data to the client device, for incorporation of the performance data into the second graphics data by the client device only if the client device is determined to be capable of incorporating the performance data into the second graphics data.

13. The computer-readable medium of claim 12,
wherein the first format is a raster graphics format, and the second format is a vector graphics format.

14. The computer-readable medium of claim 12,
wherein the instructions further direct the computer system to:
  incorporate the performance data into the second graphics data and transfer the incorporated performance data and the second graphics data to the client device only if the client device is determined not to be capable of incorporating the performance data into the second graphics data.

15. The computer-readable medium of claim 12,
wherein the instructions further direct the computer system to:
  detect a change in the first portion of the automation environment;
  receive third graphics data in the first format comprising a third graphical representation of the first portion of the automation environment;
  process the third graphics data to convert the third graphics data to fourth graphics data in the second format; and
  transfer the fourth graphics data for delivery to and display on the client device.

16. The computer-readable medium of claim 15,
wherein the instructions further direct the computer system to:
  monitor the automation environment to detect a change in the first portion of the automation environment.

* * * * *